United States Patent
Bellusci et al.

(10) Patent No.: US 10,222,450 B2
(45) Date of Patent: Mar. 5, 2019

(54) INTEGRATION OF INERTIAL TRACKING AND POSITION AIDING FOR MOTION CAPTURE

(71) Applicant: XSENS HOLDING B.V., Enschede (NL)

(72) Inventors: Giovanni Bellusci, Enschede (NL); Jeroen Hol, Hengelo (NL); Per Slycke, Schalkhaar (NL)

(73) Assignee: XSENS HOLDING B.V., Enschede (NL)

( * ) Notice: Subject to any disclaimer, the term of this patent is extended or adjusted under 35 U.S.C. 154(b) by 192 days.

(21) Appl. No.: 14/880,801

(22) Filed: Oct. 12, 2015

(65) Prior Publication Data
US 2017/0103541 A1     Apr. 13, 2017

(51) Int. Cl.
| | |
|---|---|
| *G06K 9/00* | (2006.01) |
| *G01S 5/02* | (2010.01) |
| *G01S 19/14* | (2010.01) |
| *G06F 3/01* | (2006.01) |
| *G06K 9/62* | (2006.01) |

(52) U.S. Cl.
CPC ............ *G01S 5/0294* (2013.01); *G01S 19/14* (2013.01); *G06F 3/011* (2013.01); *G06K 9/00342* (2013.01); *G06K 9/00355* (2013.01); *G06K 9/629* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 6,691,074 B1 * | 2/2004 | Moriya | G06K 9/00342 702/190 |
| 6,820,025 B2 * | 11/2004 | Bachmann | A61B 5/1114 600/595 |
| 8,165,844 B2 * | 4/2012 | Luinge | A61B 5/1114 382/107 |
| 9,076,212 B2 * | 7/2015 | Ernst | A61B 5/055 |
| 9,874,931 B1 * | 1/2018 | Koenck | G06F 3/012 |
| 9,891,705 B1 * | 2/2018 | Lahr | G06F 3/012 |
| 9,922,578 B2 * | 3/2018 | Foster | G09B 23/285 |
| 2004/0017313 A1 | 1/2004 | Menache | |
| 2008/0285805 A1 * | 11/2008 | Luinge | G06F 3/011 382/107 |

(Continued)

OTHER PUBLICATIONS

International Search Report Application No. PCT/US2016/056644 dated Dec. 22, 2016.

*Primary Examiner* — Nancy Bitar
(74) *Attorney, Agent, or Firm* — Miller, Matthias & Hull LLP

(57) ABSTRACT

An integrated inertial motion capture system includes external position aiding such as optical tracking. The integrated system addresses and corrects misalignment between the inertial (relative) and positioning reference (external) frames. This is especially beneficial when it is not feasible to rely on magnetometers to reference the heading of the inertial system. This alignment allows effective tracking of yaw in a common reference frame for all inertial sensing units, even those with no associated positional measurements. The disclosed systems and methods also enable an association to be formed between the inertial sensing units and positional measurements.

33 Claims, 8 Drawing Sheets

(56) References Cited

U.S. PATENT DOCUMENTS

| | | | |
|---|---|---|---|
| 2009/0278791 A1* | 11/2009 | Slycke | A61B 5/103 345/156 |
| 2011/0046915 A1 | 2/2011 | Hol et al. | |
| 2012/0046901 A1* | 2/2012 | Green | A61B 5/1126 702/141 |
| 2012/0223846 A1 | 9/2012 | Luinge et al. | |
| 2013/0073247 A1 | 3/2013 | Perkins et al. | |
| 2015/0192413 A1* | 7/2015 | Bellusci | G01C 21/16 702/152 |

* cited by examiner

INTEGRATION OF INERTIAL TRACKING AND POSITION AIDING FOR MOTION CAPTURE

TECHNICAL FIELD

The present disclosure is related generally to inertial tracking for motion capture and, more particularly, to a system and method for employing position aiding in inertial tracking for motion capture.

BACKGROUND 3D body motion capture is employed in a number of applications, e.g., entertainment, character animation, rehabilitation, virtual reality, gait analysis, posture and motor control, sport performance, and so on. The most commonly used form of 3D body motion capture is optical tracking. In optical tracking, several passive retro-reflective markers are attached to the main body segments of a person to track overall body motion, pose etc optically. For example, to track a user's arm, it is common to employ one marker on the hand, two on the wrist, one on the lower arm, one on the elbow, one on the upper arm, and one on the shoulder.

The passive markers are coated with a retro-reflective material to reflect light generated by strobe LEDs placed around each optical camera's lens. In this way, the position of the optical marker can be reconstructed with elementary trilateration techniques and tracked over time, provided that clear line of sight with a sufficient number of cameras is guaranteed throughout the motion capture session.

While optically-based body motion tracking can provide high accuracy drift free position tracking, it nonetheless suffers from numerous limitations. For example, the process provides a very small motion capture volume relative to the required infrastructure (e.g. about 10 cameras covering an area of 8×8 meters to guarantee an effective optical motion tracking area of only about 3×3 meters). In addition, the subject must wear several tens of markers for full body motion capture, and marker occlusion occurs frequently.

The latter problem is a fundamental limitation of the technology, which can only be slightly mitigated by over-dimensioning the system (e.g. by significantly increasing the number of cameras to reduce the frequency of marker occlusion). This, in turn, dramatically increases system cost and complexity. When marker occlusion does occur, the end-user will need to engage in laborious manual labeling of markers or, for most common use scenarios, perform for a new recording, wasting significant amount of time and resources needed to capture usable motion data.

An alternative motion capture technology is instead based on inertial sensing. This technology is usable in similar applications as those in which optical systems are used. Inertial sensing uses several inertial sensor units attached to the main body segments of the subject; for example, commercially available systems could use as many as 17 sensors for full body tracking. The primary principle in inertial motion capture technology is to integrate 3D gyroscope and 3D accelerometer signals while ensuring that the segments remain linked at their joints, to generate orientation and position data for every segment. In this way, the pose of the subject can be accurately tracked over time with high fidelity.

A significant advantage of inertial sensing is that it provides a self-contained solution which does not rely on any external infrastructure. This not only allows for motion capture in locations others than traditional laboratory settings, but it also fundamentally solves occlusion problems, simplifying the efforts and time needed by the end user to successfully achieve high quality motion capture. One disadvantage of inertial sensing based motion capture, however, is the fact of drift in absolute position tracking. The problem of drift is inherent in dead-reckoning systems since very small sensing errors can add up to a significant offset in position. Although the drift is usually very modest, for example 1% or less of traversed distance, the drift will nonetheless render the solution unsuitable for certain practical applications. For example, significant drift is unacceptable for augmented or virtual reality, or where interactions between multiple subjects are of interest.

As noted above, inertial-based body motion tracking provides numerous benefits. In an embodiment, an external position technology is used with the inertial tracking components to assist in eliminating drift. In this way, the unique benefits enabled by inertial motion tracking compared to a stand-alone optical tracking system are maintained without suffering from the inaccuracies caused by cumulative drift.

However, in order to successfully accomplish integration of such systems, certain problems and limitations need to be addressed and solved. A first fundamental problem observed by the inventors pertains to the alignment between the reference frames of the two systems. In fact, to achieve consistent motion tracking, the coordinate frames of the two systems need to be precisely aligned. Any misalignment between the systems in position or orientation will result in inconsistent motion information and the resultant detrimental effects on final performance.

A particular challenge is represented by the alignment of the heading component of the orientation (sometimes referred to as "yaw"). It is possible to stabilize the heading component of each sensing unit by using magnetometers, e.g., by referencing each inertial sensing unit's heading to magnetic North at the given geographical location. As long as the magnetic field is homogeneous in the motion capture volume, the sensing units will share a common reference heading.

In an embodiment, an external positioning system such as an optical tracking system is further used in combination with inertial body motion capture. In a typical implementation, a limited number of positional units (e.g. optical markers) are affixed to one or more inertial sensing units to allow detection and correction of drift in inertial position calculations. For example, in an implementation, a single positional unit may be affixed to a single inertial sensing unit. In a different implementation, several positional units may be used.

In a virtual reality application it may be necessary to track the subject head and appendage positions with very high accuracy. In this case, five positional units could be affixed to the inertial sensing units placed on hands, feet, and head. However, the number of positional units per subject is limited in practice, in order to preserve the benefits of the described principles as compared to a stand-alone optical tracking system.

While the use of position aiding to remove drift in the inertial position estimate will generally result in stable orientation tracking in the reference frame of the positioning system, the positioning system reference frame may not be aligned with the magnetic North reference in the motion capture volume. For this reason, when integrating an inertial motion tracking system with an external positioning aiding technology, there will generally be inconsistent headings between inertial sensing units with affixed positional units (which will have heading referenced in the positioning system coordinate frame), and sensing units without positional units (which will instead have heading referenced in the frame defined by the magnetic North in the motion capture volume).

It might be possible to estimate the difference between the two reference frames using the sensing units with affixed positional units. However, this would require a magnetic field that is homogeneous over the entire capture volume, which is generally not the case due to sources of magnetic distortion (caused by steel beams in floors/ceiling, furniture, speakers, etc.). These inconsistencies would largely nullify the potential benefits of aiding inertial based motion tracking with an accurate external positioning system.

Another problem observed by the inventors is the need to associate positional unit measurements with corresponding sensing units. While this is not a problem if a single positional unit is used (e.g. a GPS receiver or a single passive marker), or when positional units have transceivers that provide unique IDs. However, where the optical positioning system employs passive markers, the issue of associating positional units with corresponding sensing units needs to be addressed.

Moreover, the same limitation may be present in other embodiments in which inertial motion capture and external position aiding are integrated. For example, similar limitations could occur in some implementations in which an acoustic system (e.g. employing signals in the ultrasound frequency range) is used for position aiding. In some commercially available ultrasonic positioning systems, the audio channel is used only to transmit signals for precisely calculating ranges between pairs of ultrasonic transceivers, and an additional radio channel is used to communicate the transceiver ID (and sometimes to perform synchronization between the transceivers).

The use of the additional radio channel is beneficial since the audio channel capacity is relatively low, and is therefore unsuited for transmitting any additional information (as e.g. the transmitter ID) other than the signals minimally necessary for performing ranging estimation between the transceivers. However, in some implementations of these systems, in order to reduce costs, complexity, size and power consumption, it might be desired to remove the additional radio infrastructure, and use only audio transceivers placed in correspondence with some of the inertial sensing units. This solution is economical and simple, but does require special techniques to associate inertial sensing units and positional units.

While the present disclosure is directed to a system that can eliminate some of the shortcomings noted in this Background section, it should be appreciated that any such benefit is not a limitation on the scope of the disclosed principles, nor of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

SUMMARY

The disclosed principles pertain to methods and systems for integrating an inertial based motion capture system with an external position aiding technology such as optical tracking. To this end, the disclosed principles address and correct misalignment between the inertial and positioning reference frames. This is especially beneficial when it is not feasible to rely on magnetometers to reference the heading of the inertial system. This alignment allows effective tracking of yaw in a common reference frame for all inertial sensing units, even those with no associated positional measurements. The disclosed systems and methods also enable an association to be formed between the inertial sensing units and positional measurements.

Such methods and systems preserve the benefits enabled by inertial based motion tracking, while overcoming certain fundamental limitations of inertial dead-reckoning, e.g., drift. The disclosed principles also enable the use of less extensive and less complicated infrastructure as compared to traditional optical tracking systems. This maximizes the effective volume that can be used with a given infrastructure and as such reduces the cost and increases ease of use.

Other features and advantages of the disclosed systems and methods will be apparent from the following detailed description taken in conjunction with the attached drawings.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
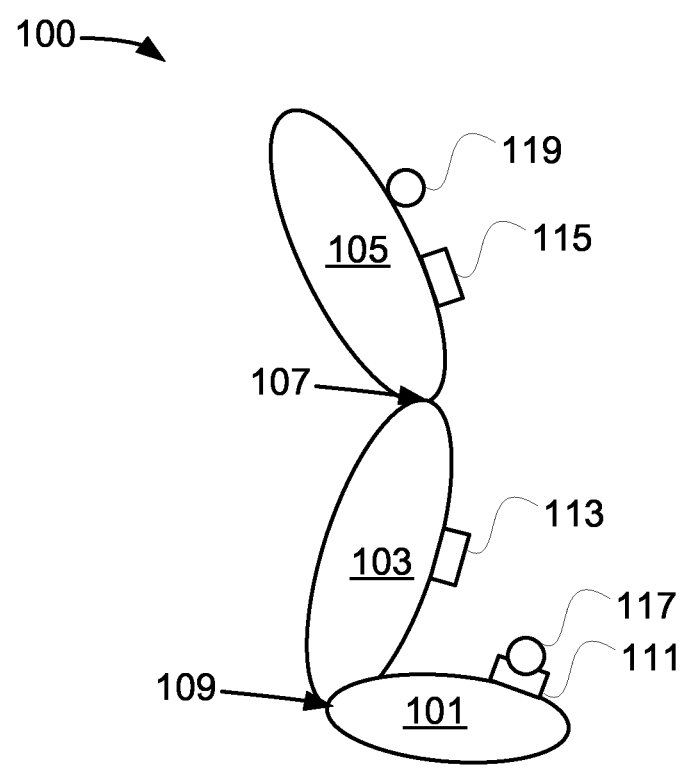
FIG. 1 is a simplified schematic of a leg consisting of a foot, lower leg and an upper leg, connected by a knee and an ankle, with each segment being instrumented with at least one inertial sensing unit.

Before presenting a detailed discussion of embodiments of the disclosed principles, an overview of certain embodiments is given to aid the reader in understanding the later discussion. For inertial based motion capture, the body of the subject, or part of it, is assumed to consist of a set of segments that are linked to each other using joints. FIG. 1 shows as an example a leg 100 consisting of three segments (foot 101, lower leg 103, and upper leg 105) connected by two joints (knee 107 and ankle 109). Additionally, each segment 101, 103, 105 is instrumented with at least one inertial sensing unit 111, 113, 115 containing at least a 3D gyroscope and a 3D accelerometer.

As noted above, inertial sensing enables the use of dead reckoning to estimate position, but this estimate will inevitably suffer from some degree of cumulative drift after some time has passed. However, in an embodiment, the inertial motion capture system is integrated with an external positioning system. In this respect, FIG. 1 further shows, by way of example, two positional units 117, 119 attached to the foot 101 and to the upper leg 105 respectively. A greater or lesser number of positional units may be used depending upon the desired implementation and any environmental constraints such as obstructions.

In a further aspect of this embodiment, the external positioning system is an optical tracking system. In this embodiment, the positional units 117, 119 are optical markers. However, it will be appreciated that in alternative embodiments, the positional units include any of a GPS receiver, an ultra-wideband radio or acoustic transceiver, or a WiFi or GSM module, or other externally-referenced positioning aid. Optionally, the positional units 111, 113 are directly attached to the corresponding inertial sensing units, and have known lever arms with respect to the 3D accelerometers of the sensing unit.

Alternatively, each positional unit 117, 119 may be affixed to a different location of the body segment 101, 105 having the corresponding inertial sensing unit 111, 115, with a known lever arm with respect to the inertial sensing unit 111, 115. While these two alternative implementations are conceptually similar, the first implementation may be preferred over the second, since it does not introduce additional soft tissue and skin artifacts between sensing units 111, 115 and their respective positional unit 117, 119.

As alluded to above, the integration of the inertial and external systems is not straightforward, and initially raises a number of problems that must be overcome. The first of these is the frame alignment problem. Recall that to estimate the motion of a subject based on inertial sensing, the 3D gyroscope and 3D accelerometer signals from the inertial sensing units attached to the subject body segments are integrated to orientation and position respectively, under the constraint that the body segments are modeled as remaining linked at their joints.

Without using any additional constraint or aiding source, the motion of the subject will drift as a whole in both position and orientation due to the inevitable integration of errors. However, the individual sensor kinematics are coupled by the joints. Thus, under mild conditions of motion, e.g. an acceleration caused by walking or sitting in an accelerating car, all relative sensor orientations become observable and can be accurately calculated. An intuitive explanation for this property is that if one fixes the initial condition on orientation of one sensing unit, this results in a certain position trajectory of the sensing unit and, assuming known lever arms, a certain trajectory of its joint centers. The latter imposes in turn a relative position aiding for the sensing units on adjoining segments.

However, in an embodiment of the disclosed principles, a position aiding results in completely observable sensor orientation under non-constant acceleration. Hence, conditioned onto the orientation of the first sensing unit, the orientation of the adjoining sensing unit becomes observable, which is what is implied by observable relative sensor orientation. In other words, the orientation of all sensing units with respect to a common, though drifting frame can be consistently estimated in a drift free manner. This observability of relative orientation is obtained without relying on aids such as magnetometers to stabilize the orientation of any of the sensing units, e.g., with respect to the heading component.

Having stable relative orientation tracking of the sensing units affixed to the subject body segments allows stable relative orientation and position tracking of the subject body segments when the orientation alignments between the sensing units and the body segments are known. The latter can be achieved either via dedicated off-line calibration routines or by other methods.

It will be seen that this method of calculating relative orientation assumes known lever arms between sensing units and joint center. This data can be practically obtained by affixing the sensing units only in known positions and using available body scaling models, by manually measuring the relevant lever arms, or by using some form of estimation.

Once relative position and orientation are attainable, a single positional unit of an external positioning system can be affixed to one of the body segments to correct for drift in orientation and position trajectory of the corresponding inertial sensing unit. This in turn allows stable orientation and position tracking for all the other inertial sensing units as well. That is, each inertial sensing unit and hence each body segment will be tracked without drift in the reference frame defined by the external positioning system, even without magnetometer data.

In this way, the problem of alignment between reference frames of the inertial system and the positioning system is resolved. In fact, both position and orientation trajectories of the body segments can then be consistently expressed in the reference frame of the positioning system. Although position aiding for a single inertial sensing unit on a linked body represents the minimum requirement for achieving drift free orientation and position tracking for the full linked segment body, the same method will work in a similar way when each of a multitude of inertial sensing units is associated with a respective positional unit.

Figure 2:
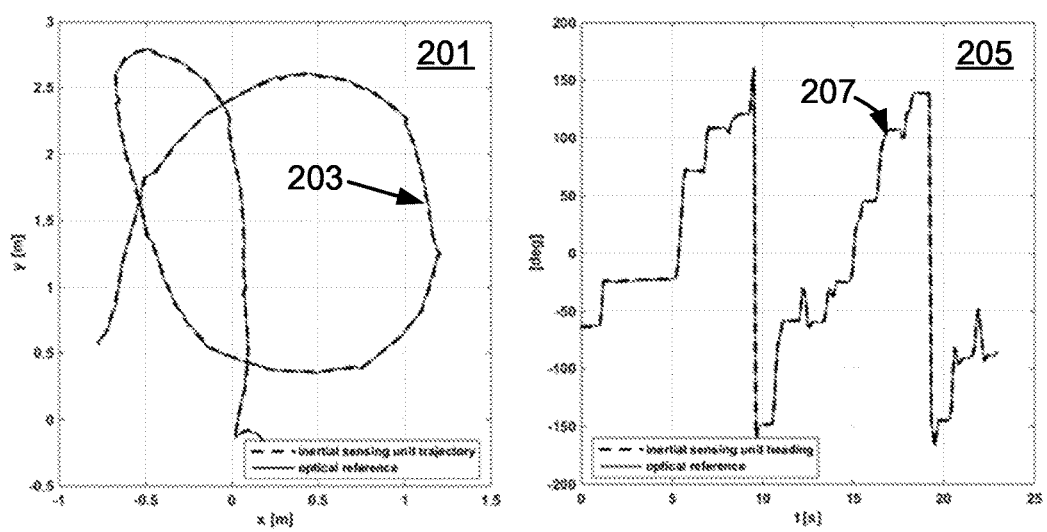
FIG. 2 is a data diagram having a set of data plots showing the position trajectory on the x-y plane for an inertial sensing unit attached to a user's left foot during a walking trial and the heading component of the orientation of the sensing unit.

This point is illustrated further by means of the data plots shown in FIG. 2. In a trial, seven inertial sensing units were placed on the main body segments of the subject lower body (pelvis, right upper leg, right lower leg, right foot, left upper leg, left lower leg, and left foot). Additionally, a single optical marker attached to the right foot was used to correct for drift in the overall inertial motion capture solution. The data plot 201 shows the position trajectory 203 on the x-y plane for the inertial sensing unit attached to the left foot during a walking trial.

For comparison, the corresponding trajectory of an additional optical marker attached to the same left foot and used only to provide a reference trajectory (i.e., not used for the motion tracking) is also shown. The second data plot 205 shows a similar plot 207 for the heading component of the orientation; in this case the reference heading used for comparison was measured with a cluster of three optical markers attached to the same inertial sensing unit.

As can be seen, the disclosed method is capable of solving for drift in orientation tracking and position tracking in the overall inertial motion capture solution. In fact both the orientation and position of all the inertial sensing units, and hence of all the corresponding body segments, are tracked without any drift directly in the reference frame of the optical system without requiring each segment to have an optical marker.

Moreover, since the disclosed techniques capitalize on joint constraints involving integral quantities (i.e., positions) rather than instantaneous quantities (e.g., accelerations), the signals from the inertial sensors may be pre-processed via Strap Down Integration (SDI) techniques. The compatibility with SDI allows a high level of inertial tracking accuracy even while decreasing the transmission rate of inertial motion data and under conditions in which data transmission is unreliable (lossy). The latter is typically beneficial for body motion capture applications due to the typical need to transmit acquired data through a wireless link having limited bandwidth resources.

The detailed discussion above has primarily focused on integration of inertial-based motion capture with an optical tracking system, in which case the positional units are represented by optical markers. However, the disclosed techniques are more widely applicable, and apply to integrating inertial-based motion capture with any other external positioning system. Examples of alternative aiding positioning information include positioning information from any of an acoustic system, an ultra-wideband radio system, GPS or GNSS, WiFi, a magnetic field map, cellular network, computer vision, and others.

Figure 3:
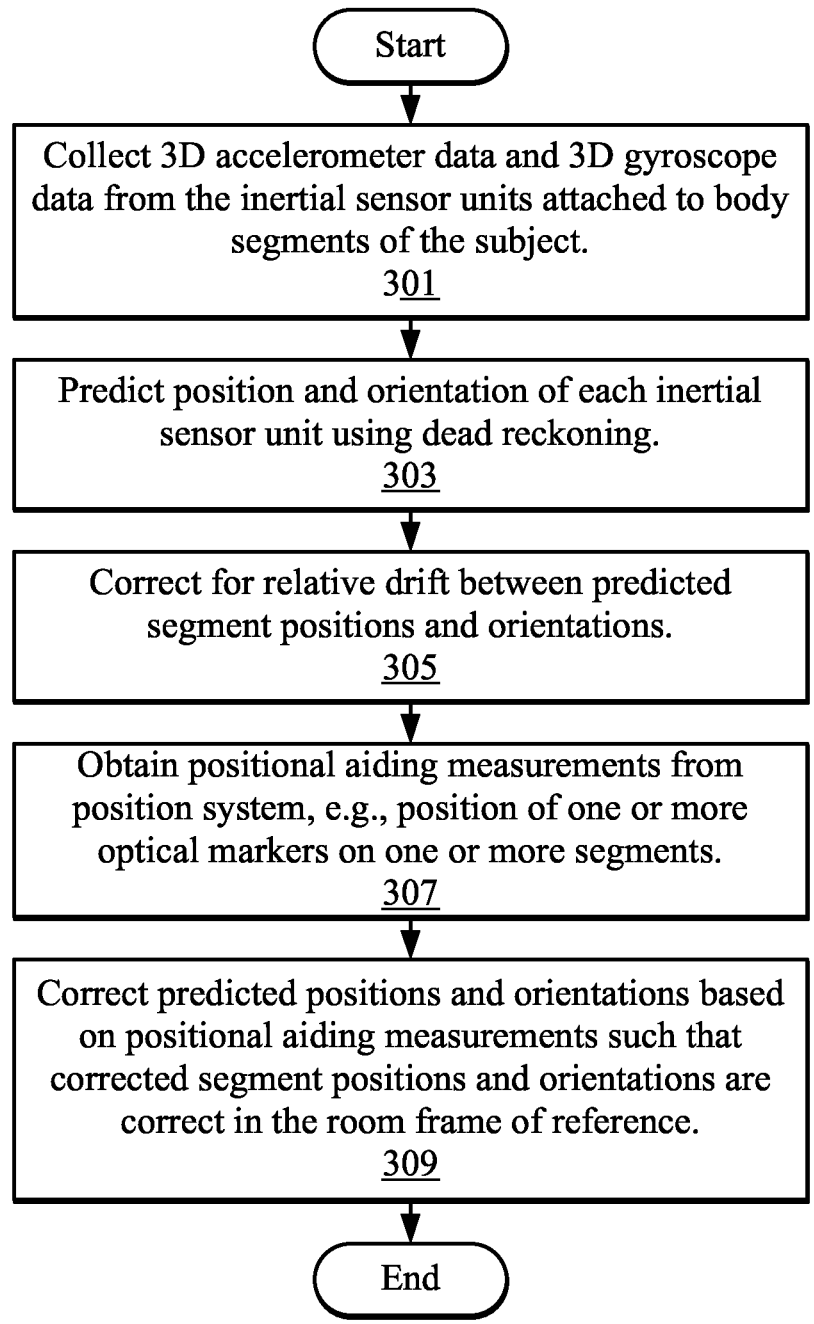
FIG. 3 is a flowchart of a process for calculating body segment trajectories in accordance with an embodiment of the disclosed principles.

Although the precise method steps used to implement the disclosed principles can vary, FIG. 3 illustrates an exemplary stepwise tracking process 300. The steps of the illustrated process may take place at the sensor unit, at a remote device such as a stationary PC near the object being tracked, or at a combination of such locations. The example shown will assume that the data processing steps take place at a monitoring station, e.g., a PC that is in wireless communication with the inertial sensors and in wired or wireless communication with the position aiding system.

At stage 301 of the process 300, the monitor collects 3D accelerometer data and 3D gyroscope data from the inertial sensor units attached to body segments of the subject. The monitor predicts the position and orientation of each inertial sensor unit at stage 303 using dead reckoning. At stage 305, the monitor corrects for relative drift between the predicted segment positions and orientations. In particular, the monitor may set joint centers for each segment equal to the corresponding joint center of each adjoining segment.

Although any relative drift may be substantially eliminated in this way, overall drift in the position system frame of reference (e.g., the optical tracking system frame of reference) may still be present. Thus at stage 307, the monitor obtains one or more positional aiding measurements from the position system. The one or more position aiding measurements include, in an embodiment, the position of one or more optical markers affixed to one or more segments of the object being tracked.

At stage 309, the monitor adjusts the predicted positions and orientations, as corrected for relative drift, based on the one or more positional aiding measurements. In this way, not only are the segment positions and orientations correct relative to one another, but they are also correct in the room frame of reference. This improvement over drift-prone dead reckoning provides accuracy similar to a traditional expensive optical tracking system while costing little more than a traditional dead reckoning-only tracking system. In addition, the illustrated system and process are much less complicated and limited than traditional optical tracking systems.

While alignment between the reference frames of the inertial and positioning system are thus ensured, particularly with respect to the heading component of orientation without any need to rely on magnetometers, there is also a need to ensure an accurate association between any positional units and the related inertial sensing units. This is especially important if there is no definitional way to determine the association, i.e., when there are more than one positional unit used, and the positional units do not transmit a unique ID (e.g. via ultra-wideband transceivers).

Thus, the need to ensure an accurate association between any positional units and the related inertial sensing units remains in embodiments in which the inertial motion capture system is integrated with a passive optical positioning system using unlabeled optical markers.

In an embodiment, the association is made based on the inertial dead-reckoning predictions. In particular, within short time intervals, dead-reckoning provides an accurate prediction of the expected position of the corresponding positional unit on the same body segment as the inertial sensing unit. Assuming that a correct association between an inertial sensing unit and a corresponding positional unit was known at generic time t, the position $p(t+T)_P$ of the positional unit at generic time t+T in the positioning system reference frame can be calculated as:

$$p(t+T)_P = p(t+T)_S + R(t+T)_v^{PS} v_{PS}^S \qquad (1)$$

where $v_{PS}^S$ is the known lever arm between positional unit and inertial sensing unit in the reference frame of the sensing unit, $R(t+T)_v^{PS}$ is the rotation matrix between sensing unit and external positioning frame at time t+T, and $p(t+T)_S^P$ is the position of the inertial sensing unit at generic time t+T predicted by the inertial dead-reckoning mechanization equation as:

$$p(t+T)_S = p(t)_S + Tv(t)_S + 0.5T^2 a(t)_S \qquad (2)$$

with $v(t)_S$ and $a(t)_S$ being the inertial sensing unit velocity and free acceleration respectively at time t.

Given the above, when a set of unlabeled positional measurements is available, the correct association between each of the positional measurements and its corresponding inertial sensing unit can be generally solved for. For this purpose, in a straightforward implementation, standard hypothesis testing methods are used. For example, in an embodiment the j-th positional unit measurement $p(t+T)_M^j$ at generic time t+T could be associated to the inertial sensing unit i if the following test is satisfied:

$$|p(t+T)_M^j - p(t+T)_P^i| < e_d \qquad (3)$$

where |.| is the norm operation, $p(t+T)_P^i$ is the positional unit position predicted with inertial dead-reckoning from the i-th sensing unit as in (1), (2), and $e_d$ represents the maximum error in order to accept the tested hypothesis. The quantity $e_d$ may be a fixed design parameter, or may instead be related to the estimated statistical uncertainties of the positional unit measurement and inertial dead-reckoning based predicted position. In some variations of this exemplary implementation, additional signal processing could be used to provide increased robustness. For example, either standard outlier rejection techniques based on measurement residuals, or nearest neighbor methods could be further used to the purpose, to mention only a few possible options.

Where the positional units are passive optical markers, it will be appreciated that the method previously described generally provides solution to the association problem in the event a clear view of at least one optical marker with sufficient number of cameras is preserved at each time instant. In fact, in this case, the marker position needs to be predicted by inertial dead-reckoning for only the very short time interval corresponding to the optical markers measurement period, which typically ranges from some milliseconds to a few tens of milliseconds. The accuracy of inertial dead-reckoning for such short time instants is extremely high, even when using inexpensive MEMS-based inertial sensors.

However, an effective solution still exists in the case of occasional marker occlusion which is not uncommon in optical tracking systems. This point is illustrated in greater detail in FIG. 4. The lower plot 401 plots the difference between marker position predicted by inertial dead-reckoning and the actual optical marker position during a walking trial of about 15 seconds duration. The position trajectory for the considered marker, placed on the right foot of the subject, is shown in the upper plot 403.

During the time interval 405 between about 10 and 12 seconds, a gap of two seconds duration in optical data is simulated. It can be seen that in case of no gap in optical data, the error in predicted position is at sub-millimeter level. This error remains however very small during the gap 405 in optical data as well; as can be seen in plot 401, the error is within approximately 6 mm for the entire duration of the gap 405. Thus, as can be seen, the described technique is robust against occasional short duration marker occlusion.

Figure 5:
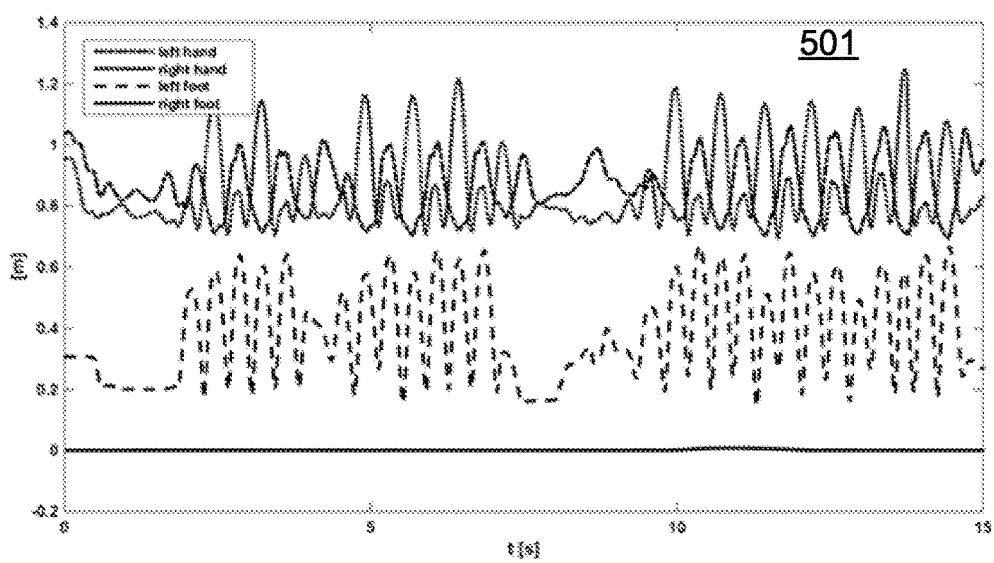
FIG. 5 is a position plot of a test of an optical marker belonging to the right foot, for the case of 4 candidate optical markers on feet and hands, in presence of occasional marker occlusion.

The result of this fact with respect to associating markers and sensor units is shown in FIG. 5. In particular, the plot 501 of FIG. 5 shows the use of the statistic in eq. (3) to test the optical marker belonging to the right foot, for the case in which 4 candidate optical markers on feet and hands are present. As can be seen, the method is able to identify the correct association, even with occasional marker occlusion.

Figure 4:
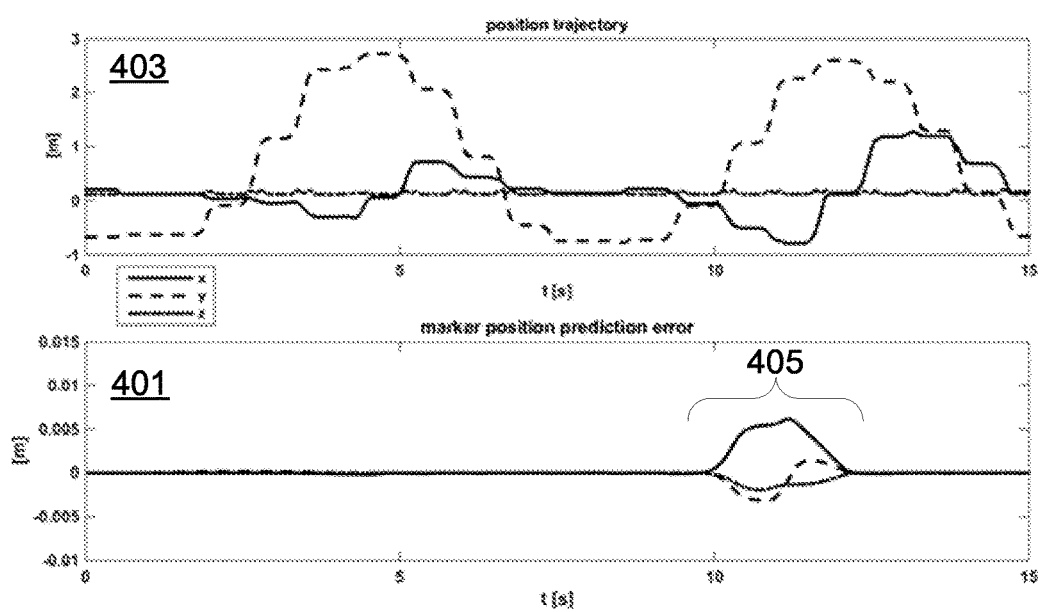
FIG. 4 is a data diagram having a set of data plots showing the difference between marker position predicted by inertial dead-reckoning and the actual optical marker position during a walking trial, as well as the position trajectory for the marker.

The foregoing example additionally serves to illustrate the unique benefits enabled by aiding inertial-based motion tracking with an external optical position system. Even upon occurrence of rather prolonged marker occlusion, the motion capture quality is not degraded. The actual motion dynamics remain accurate at all times, regardless of occlusion, due to the use of inertial-based tracking in combination with joint constraints. Moreover, the error in absolute position tracking (about 6 mm as shown in FIG. 4), is negligible for practical applications.

It should be noted that this method is effective in all cases in which at least a single optical marker remains visible at any given time. Even very long gaps in optical data from some markers can be tolerated without any performance degradation as long as at least one optical marker is still visible.

In comparison, when using a stand-alone optical motion capture system for the same example, including two seconds marker occlusion, the results would be much worse. In particular, the overall recording would be useless, since after two seconds the motion dynamics could not be reconstructed, even using well-known signal interpolation techniques.

In the above described method, the association between inertial sensing units and corresponding positional units is made via an assumption that an initial correct association between the two is in place. For this reason, when practically using this method, an initialization step is necessary in which a first correct association between inertial sensing units and corresponding positional units is provided. In some embodiments, this limitation might not be of concrete relevance. In fact, it might be possible to provide initialization by manual labeling of positional units for example at the beginning of a new recording session, e.g. as part of a more general system calibration routine.

In other implementations, however, it may be desirable to eliminate the need for manual intervention. For example, in some use scenarios it might be expected that the subject might frequently leave the positioning system tracking volume and then come back to it. This could be the case when it might be of interest to remove the absolute drift in inertial motion capture only in specific portions of the overall recording session, for example in case one might want the subject to very precisely interact with a virtual scene only during specific parts of the capture session.

However, when leaving the positioning system tracking volume for prolonged time, inertial dead-reckoning could result in substantial drift in absolute position tracking. For this reason, upon the subject coming back to the positioning system tracking volume, using the test provided in eq. (3) to associate inertial sensing units to positional units could result in erroneous associations. In order to address this limitation, additional solutions are discussed in the following. Such solutions might be used either alone or in combination with the previously described methods to solve for the association problem.

In this respect, it is additionally observed by the inventors that both the inertial sensing units and the positional units are affixed to segments that together represent a linked segment body. As noted above, although in absence of any additional external aiding the absolute orientation and position trajectories of the inertial sensing units will generally drift over time, their relative orientation and position trajectories can generally be very accurately tracked over time without any drift just by integration of 3D accelerometer and 3D gyroscope signals in combination with joint constraints.

Accordingly, if a set of positional unit measurements needs to be associated to a set of inertial sensing units, the underlying geometric constraints introduced by the linked segment model can generally be exploited to that end. This concept is clarified via the illustration of FIG. 6.

Figure 6:
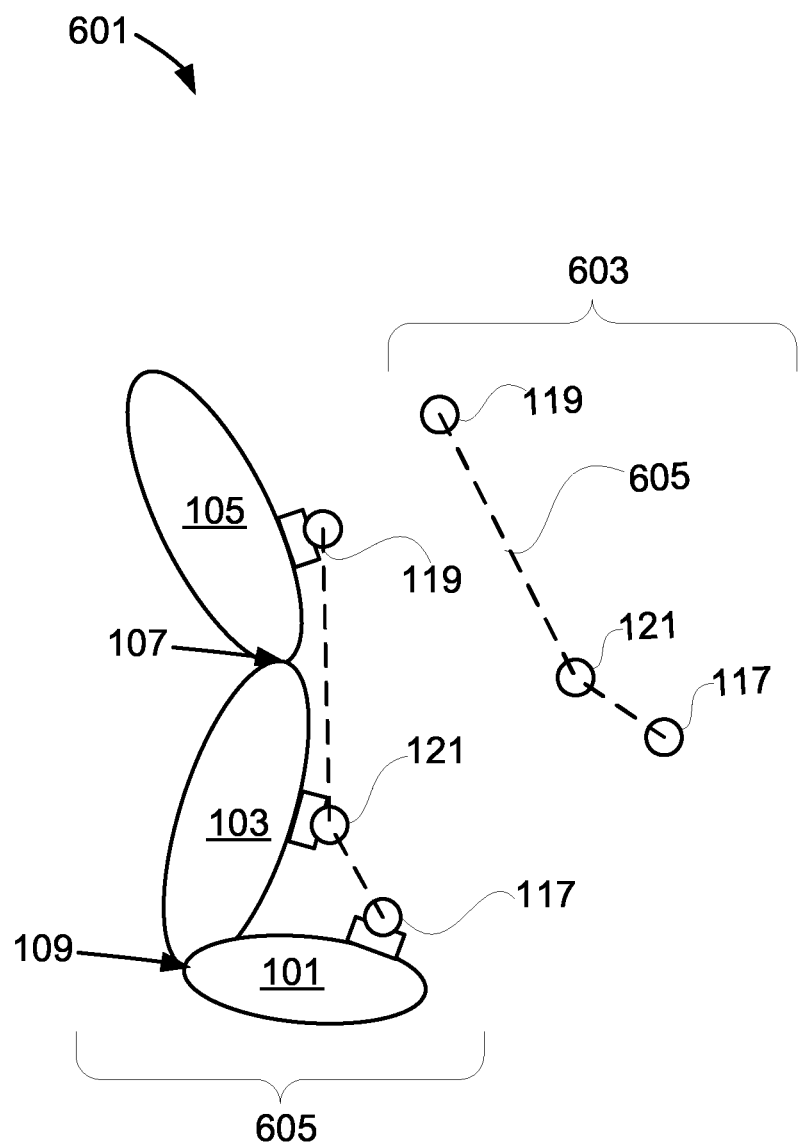
FIG. 6 is a data plot showing the difference between the positions of positional units as predicted by inertial dead-reckoning and the actual positions of the positional units, showing that the difference results in a rigid body transformation.

The plot 601 of FIG. 6 illustrates the difference between the positions of positional units 117, 119, 121 as predicted by inertial dead-reckoning (603) and the actual positions (605) of the positional units 117, 119, 121, and as can be seen, the difference results in only a rigid body transformation. Although the positions that are predicted based on inertial dead-reckoning exhibit significant drift compared to their actual position, the underlying shape defined by the positional units remains the same in both cases.

As such, it is generally possible to formulate an optimization problem with search space including the unknown association between inertial sensing units and positional units by using metrics that capitalize on the common underlying geometrical shapes defined either by the positional units positions predicted by inertial dead-reckoning or by the positional units measurements. The formulation of such optimization problem is generally not unique, and many different implementations can be provided. This general observation will be further elaborated in the following examples.

Consider the generic case in which a set of N inertial sensing units affixed to N segments of the subject body, taken from the overall set of $N_T$ inertial sensing units affixed to the $N_T$ segments of the subject body, need to be associated to N positional measurements corresponding to positional units affixed to the same body segments. Note that in a typical implementation, N is smaller than $N_T$, meaning that only a few of the overall segments with affixed inertial sensor units will also have an affixed positional unit.

In an embodiment, assuming that a correct association between the set of N inertial sensing units and the set of N positional units is in place, the rigid body transformation between the set of positional units positions estimated by inertial dead-reckoning and the set of positional units measurements can be calculated by solving an elementary optimization problem; when this rigid body transformation is applied, the difference between the transformed set of positional units positions estimated by inertial dead-reckoning and the set of positional units positions measurements will be very small.

Reverting this argument, one might instead think to determine the unknown associations jointly together with the rigid transformation, by minimizing the following problem:

$$\min_{\substack{R \in SO_3 \\ r \in \mathbb{R}^3 \\ J \in \mathbb{N}^N}} \sum_{j=1}^{N} \left| (Rp(t)_M^j - r) - p(t)_P^{J(j)} \right| \quad (4)$$

where J is an assignment vector, and $p(t)_M^j$ and $p(t)_P^j$ are the j-th positional unit measurement and j-th positional unit position predicted by inertial dead-reckoning, respectively. R and r represent the rotation and translation defining the rigid body transformation between the set of positional units measurements and the set of positional units positions predicted by inertial dead-reckoning. For a given candidate association, using least-squares, r can be calculated as:

$$r = \frac{1}{N} \sum_{j=1}^{N} \left( p(t)_M^j - p(t)_P^{J(j)} \right)$$

whereas R can be calculated in equivalent quaternion form as the eigenvector corresponding to the maximum eigenvalue of:

$$A = -\sum_i L(p(t)_M^j - \text{mean}(p(t)_M)) R(p(t)_P^{J(j)} - \text{mean}(p(t)_P))$$

with L(x) and R(x) being defined respectively as:

$$L(x) = \begin{pmatrix} 0 & -x^T \\ x & [x \times] \end{pmatrix}, R(x) = \begin{pmatrix} 0 & -x^T \\ x & -[x \times] \end{pmatrix}$$

and [x×] representing the cross-product operation. Since the assignment vector J results in a finite set of possible combinations, the minimization in (4) can simply be performed by brute-force search of all possible candidate associations.

Figure 7:
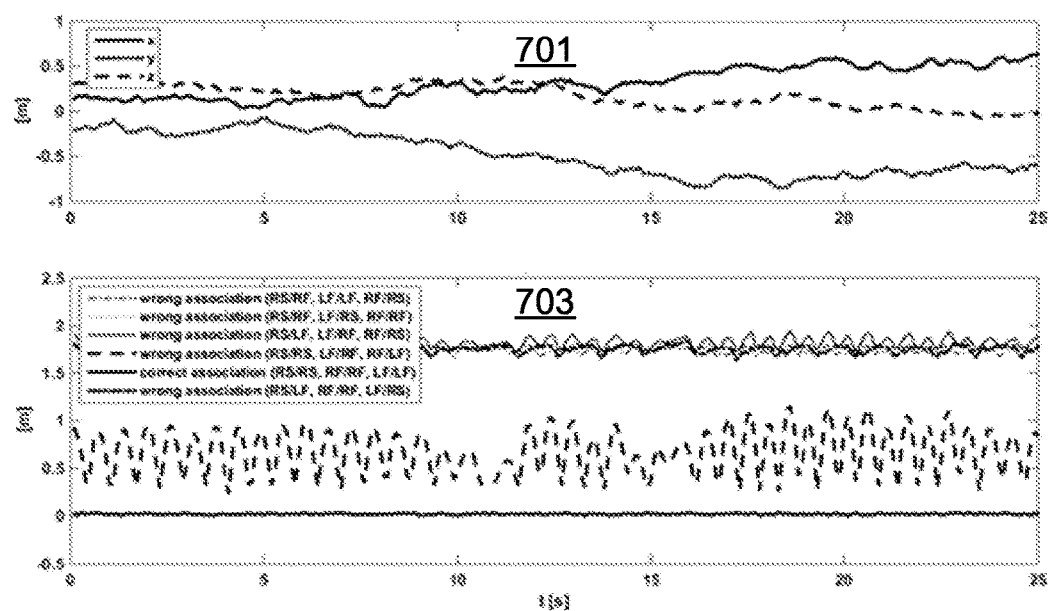
FIG. 7 is a data diagram having a data plot set showing drift in absolute position tracking provided by inertial dead-reckoning and a test statistic for brute-force testing all possible associations.

The performance of the disclosed method is illustrated in more detail in FIG. 7. The drift in absolute position tracking provided by inertial dead-reckoning is shown in the top plot 701 for the considered trial. This drift reaches about 1 meter in the overall trial of about 25 seconds' duration. In the bottom plot 703, the test statistic of eq. (4) is shown when brute-force testing all possible associations. In the considered example, three pairs of inertial sensing units and positional units (passive optical markers), placed on right shoulder, right foot and left foot, were considered, resulting in a total of 6 possible combinations to be tested. It can be seen that drift in absolute position tracking resulting from inertial dead reckoning is immaterial for the disclosed method. In fact, the correct association (thick continuous line) is always clearly identifiable all times.

It should be appreciated that N≥3 is required to generally provide a solution to eq. (4). For some applications, however, the specific case N=2 may be of interest. For example, consider a case in which only the hands are to be tracked with very high accuracy. The direct use of eq. (2) would in this case result in ambiguity, since it will generally not be possible to uniquely determine R and r. This ambiguity can however be trivially solved by using one or more additional constraints.

For example, in an embodiment, information about gravity direction is included in the positioning system frame. This information is generally available as a byproduct of dedicated calibration routines; for example, in optical tracking systems the vertical direction is typically aligned with gravity. Using gravity information immediately provides a solution to the aforementioned limitation. As a further example in this respect, it is noted that, although in the absence of additional external constraints the heading component of orientation from inertial motion tracking will generally drift over time, this drift will be extremely limited due to the use of joint constraints which allow correction of a large portion of the sources of drift (e.g. gyroscope bias). For this reason, approximate heading information can be additionally used as a further constraint, in an alternative embodiment.

Alternatively, the same limitation can be addressed by including in the optimization problem additional features common to the two systems, as for example the sensing units/positional units velocity or speed. For example, for the case of velocity, the minimization problem in (4) becomes:

$$\min_{\substack{R \in SO_3 \\ r \in \mathbb{R}^3 \\ J \in \mathbb{N}^N}} \sum_{j=1}^{N} \left| (Rp(t)_M^j - r) - p(t)_P^{J(j)} \right| + k \left| (Rv(t)_M^j - r) - v(t)_P^{J(j)} \right| \quad (5)$$

with similar notation as previously introduced, and k being a weighting factor. In an alternative embodiment, to address the same problem, a position trajectory within a time window $[t_1, t_2]$ is used to the purpose, resulting in:

$$\min_{\substack{R \in SO_3 \\ r \in \mathbb{R}^3 \\ j \in \mathbb{N}^N}} \sum_{j=1}^{N} \left| (Rp([t_1, t_2])_M^j - r) - p([t_1, t_2])_P^{J(j)} \right|$$

In this way, any small motion within the considered time interval will increase the discriminative power of the disclosed test statistic. All these alternative formulations can be used either alone or in combination, to provide increased robustness and performance.

Further, although the previous considerations have been disclosed to offer solution to the specific case of N=2, they are also applicable where N≥3 as well. This may be beneficial in improving robustness in solving the association problem, reducing the occurrence of multiple solutions in the minimization problem which might occur under particular shapes defined by the set of sensing units and positional units. Consider as an example in this respect the case of three positional units, two of which are symmetric with respect to a line intersecting the third.

It should be appreciated that multiple minima generally do not degrade performance. In fact, eq. 4 may be brute-force tested for all possible candidate associations. Multiple solutions to the minimization problem therefore will manifest themselves, and for this reason can be discarded. However, reducing the chance of occurrence of multiple minima may be beneficial to improve applicability of the disclosed methods.

The number of candidate associations to be tested deserves some further consideration. In fact, in a scenario in which N positional units need to be associated to N sensing units, if using a brute-force approach in which all candidate associations are tested, the number of possible combinations are factorial(N); e.g. for N=4, they would be 24. This number would rapidly grow with increasing N; for example, N=8 would result in 40320 possible combinations. In some implementations, it might be desired or required to reduce the number of candidate associations, for example to allow for a real time implementation in a constrained resources platform.

This problem can be addressed by capitalizing again on the underlying geometrical constraints introduced by the linked segment model. In fact, it is observed that $N_{min}=3$ is actually sufficient to generally solve for the association between the considered $N_{min}$ sensing units and the corresponding positional units. This means that the rotation and translation between the $N_{min}$ sensing units and corresponding positional units, R and r, is defined as well, after solving for the association between the considered $N_{min}$ pairs.

However, since all the remaining $N-N_{min}$ pairs of sensing units and positional units are constrained by the same underlying linked segment model, they will share the same R and r previously determined, which allows a solution for the remaining $N-N_{min}$ associations as well. Capitalizing on this observation, it is therefore necessary to associate only $N_{min}$ sensing units to $N_{min}$ positional units selected over a set of N candidate ones. The latter results in:

factorial(N)/factorial($N-N_{min}$)

possible combinations. For example, for the previously considered case of N=8, only 336 combinations need to be tested, i.e. 120 times less than the original brute-force approach.

Moreover, it is observed that if the lowest level of computational complexity is desired, then additional constraints, previously discussed, may be used. For example, when using gravity information, $N_{min}=2$ is needed to solve for the association problem. For the previously considered case of N=8 candidate positional units, this would result in only 56 associations to be tested. Note that $N_{min}=2$ would additionally simplify the calculation of R since only the heading component, rather than the full rotation matrix needs to be estimated.

Although the preceding discussion has focused on the exemplary case of motion capture of a single subject, the disclosed methods generally apply to the case in which n subjects might be present, each with their own set of inertial sensing units and positional units. Following similar considerations as previously disclosed, the number of possible associations to be tested in this case would result in:

factorial(nN)/factorial($nN-N_{min}$)

Although the previous expression represents a general solution to the problem, the specific case of multiple subjects is suited for implementation of several additional techniques to reduce the search space for candidate associations. For example, one could partition the set of candidate positional units into subsets according to further geometrical considerations, such as the maximum allowed distance between positional units to potentially belong to the same subset.

This would allow an iterative search method in which each candidate positional unit is tested only in combination with a set of $N_{min}-1$ other positional units selected among those within said maximum allowed distance; when not leading to a successful association the candidate positional unit could be directly discarded from the original set. This method generally allows significant reduction in the number of associations to be tested. It should be noted that this description does not attempt to capture all such optimizations as may be apparent to those of skill in the art upon reading this disclosure.

It is further noted that presence of outliers in the data (e.g. ghost markers in the case where the positioning system is a passive optical system, e.g. created by reflections in mirrors, windows, etc.), is generally immaterial for the disclosed methods, although such could result in increased search space for the association problem between inertial sensing units and positional units. However, inertial prediction and/or underlying geometrical constraints from the linked segment model can minimize the aforementioned problem.

As previously commented, the example formulation in eq. (4) is not the only possible formulation. Rather, different alternative metrics could be used in various alternative embodiments. For example, in an alternative implementation, the association between sensing units and markers is found by comparing distances between pairs of inertial sensing unit positions and pairs of positional unit positions. This method rests on the idea that where two sets of points have an identical shape, the distances between all pairs of points within each set should match. The minimization problem can be accordingly formulated as:

$$\min_{i,j \in \mathbb{N}^N} \sum_i \sum_j \left\| |p(t)_M^i - p(t)_M^j| - |p(t)_P^{J(i)} - p(t)_P^{J(j)}| \right\|$$

using similar notation as previously introduced. This example leads to similar considerations as those previously disclosed for the method described in eq. (4), and for this reason it is not detailed further herein.

It is additionally noted that all the disclosed methods can be implemented either in real time, or as post-processing solutions. The latter may be especially beneficial in implementations directed to achieving an ideal level of performance. In fact, the described association based on global metric minimization may serve as a new initialization in turn used by the association based on inertial prediction.

Figure 8:
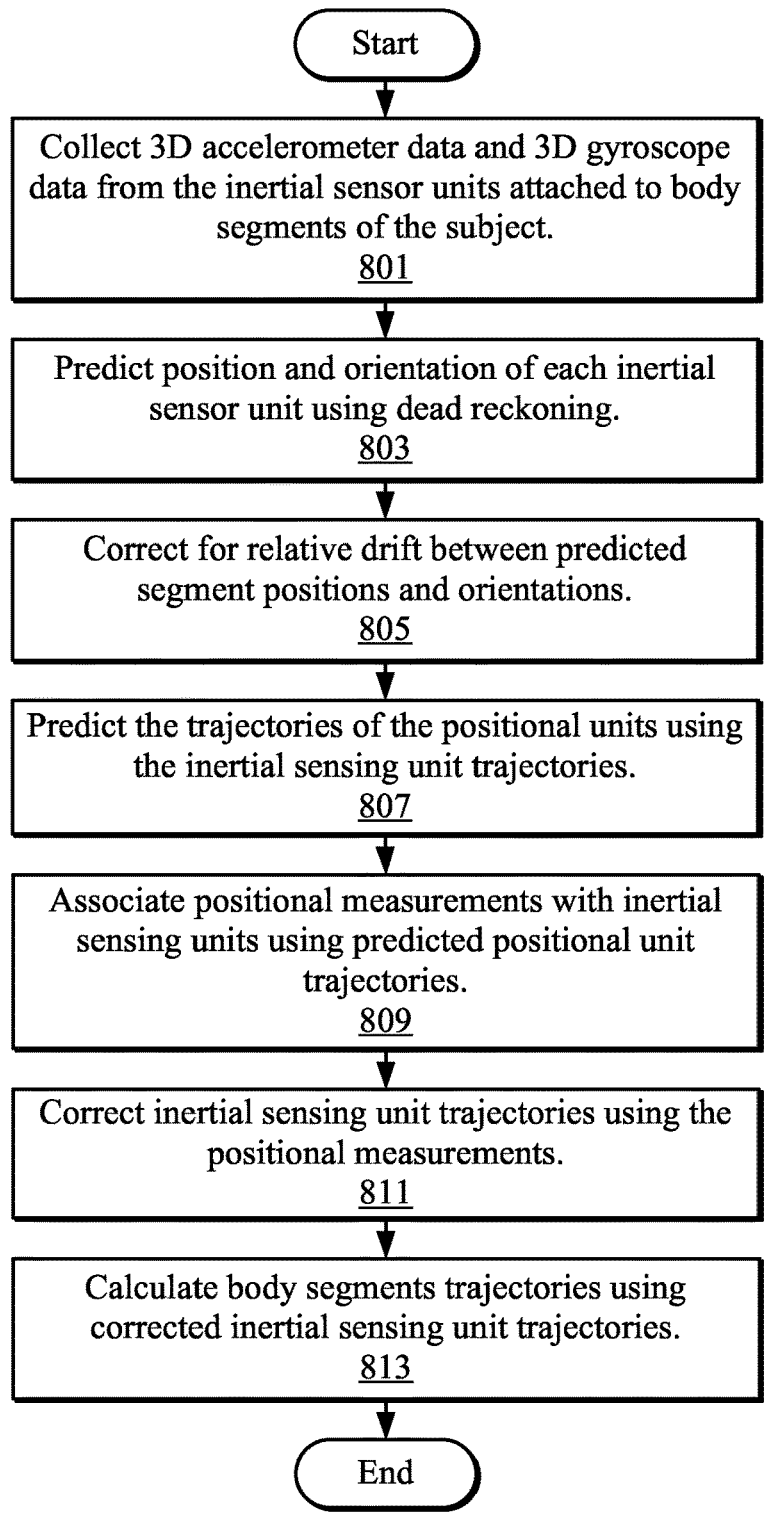
FIG. 8 is a flowchart of an alternative process for calculating body segment trajectories in accordance with an alternative embodiment of the disclosed principles.

A method embodiment in accordance with the foregoing discussion is shown in FIG. 8. The described steps, in combination with the detailed teachings disclosed in more detail in this disclosure, provide solutions to the general problems and limitations observed by the inventors, when integrating together inertial based motion capture with an external position aiding mechanism such as optical tracking.

At stage 801 of the process 800, the monitor collects 3D accelerometer data and 3D gyroscope data from the inertial sensor units attached to body segments of the subject. The monitor predicts the position and orientation of each inertial sensor unit at stage 803 using dead reckoning. At stage 805, the monitor corrects for relative drift between the predicted inertial sensor unit positions and orientations. In particular, the monitor may set joint centers for each segment equal to the corresponding joint center of each adjoining segment.

The monitor then predicts the trajectories of the positional units using the inertial sensing unit trajectories at stage 807. As noted above, the behavior of the positional units is made meaningful via associating them with appropriate sensing units. Thus at stage 809, the monitor associates positional measurements with inertial sensing units by using the predicted positional unit trajectories as discussed above.

Once the positional measurements are associated with the correct inertial sensing units, the monitor now corrects the inertial sensing unit trajectories at stage 811 using the positional measurements and calculates body segments trajectories by using the corrected inertial sensing unit trajectories at stage 813.

It will be appreciated that various systems and processes related to position tracking have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. An inertial sensor system to provide drift-free segment trajectories for a jointed segmented body having multiple segments wherein adjacent segments are connected by joints, the system comprising:
    a plurality of inertial sensor units responsive to translation and rotation, each being configured for mounting to a segment of the body;
    a tracking system configured to track a position of at least one of the segments in a frame of reference external to the body; and
    a tracking station including a processor configured to collect inertial sensed data from the plurality of inertial sensor units and to estimate the positions and orientations of the plurality of inertial sensor units with respect to one another, correct the estimated positions and orientations for relative drift based on a condition that adjacent segments remain connected at the interstitial joints, and to receive positional data from the tracking system regarding the position of the at least one segment and to adjust, as a group, the corrected estimated positions and orientations based on the position of the at least one segment to eliminate overall drift of segment trajectories in the frame of reference of the tracking system, the tracking station being further configured to correct the corrected estimated positions and orientations based on the position of the at least one segment to eliminate overall drift in the frame of reference of the tracking system.

2. The inertial sensor system in accordance with claim 1, further comprising at least one positional unit associated with at least one segment and wherein receiving positional data from the tracking system regarding the position of at least one segment includes associating the at least one positional unit with a corresponding at least one segment.

3. The inertial sensor system in accordance with claim 2, wherein associating the at least one positional unit with a corresponding at least one segment further comprises assigning the at least one positional unit with the corresponding at least one segment based on a predicted trajectory of one or more positional units.

4. The inertial sensor system in accordance with claim 1, wherein the tracking system includes a positional unit configured to be affixed to the at least one segment and a tracking detector remote from the body configured to track a position of the positional unit.

5. The inertial sensor system in accordance with claim 4, wherein the tracking system is an optical tracking system including one or more cameras and the at least one positional unit is an optical marker.

6. The inertial sensor system in accordance with claim 4, wherein the at least one positional unit consists of a single positional unit.

7. The inertial sensor system in accordance with claim 1, wherein the tracking system comprises a GPS receiver.

8. The inertial sensor system in accordance with claim 1, wherein the tracking system comprises at least one of an ultra-wideband radio and an acoustic transceiver.

9. The inertial sensor system in accordance with claim 1, wherein the tracking system comprises at least one of a Wi-Fi or GSM module.

10. The inertial sensor system in accordance with claim 4, wherein the positional unit is configured to be affixed to the at least one segment with an inertial sensor unit.

11. The inertial sensor system in accordance with claim 4, wherein the positional unit is configured to be affixed to the inertial sensor unit that is also affixed to the at least one segment.

12. The inertial sensor system in accordance with claim 4, wherein the positional unit is configured to be affixed remote from an inertial sensor unit that is also affixed to the at least one segment.

13. The inertial sensor system in accordance with claim 1, wherein the processor of the tracking station is configured to adjust, as a group, the corrected estimated positions and orientations by applying one or both of a rigid body translation and a rigid body rotation.

14. The inertial sensor system in accordance with claim 1, wherein the processor of the tracking station is configured to use the corrected estimated positions and orientations when the tracking system becomes inoperable and to again use the positional data when the tracking system becomes operable again after a period of inoperability.

15. A method of providing drift-free segment trajectories for a jointed segmented body having multiple segments wherein adjacent segments are connected by joints, the method comprising:
    placing a plurality of inertial sensor units responsive to translation and rotation on respective segments of the body;
    collecting inertial sensed data from the plurality of inertial sensor units;
    estimating the positions and orientations of the plurality of inertial sensor units via dead reckoning based on the collected inertial sensed data;
    correcting the estimated positions and orientations for relative drift based on adjacent segments remain connected at the interstitial joints;
    determining a position of at least one segment in a frame of reference external to the body; and
    adjusting the corrected estimated positions and orientations of all body segments as a group based on the determined position of the at least one segment to eliminate overall drift of segment trajectories in the frame of the external reference.

16. The method in accordance with claim 15, wherein determining a position of at least one segment based on an external reference includes affixing a positional unit to the at least one segment and tracking the positional unit with a tracking detector remote from the body.

17. The method in accordance with claim 16, further comprising associating the positional unit with the at least one segment.

18. The method in accordance with claim 17, wherein associating the positional unit with the at least one segment further comprises assigning the positional unit to the at least one segment based on a predicted trajectory of one or more positional units.

19. The method in accordance with claim 16, wherein the tracking system is an optical tracking system including one or more cameras and wherein affixing a positional unit to the at least one segment comprises affixing an optical marker to the at least one segment.

20. The method in accordance with claim 16, wherein the at least one positional unit is a single positional unit.

21. The method in accordance with claim 15, wherein the external reference comprises at least one of a GPS receiver, an ultra-wideband radio, an acoustic transceiver, a Wi-Fi_33 module and a GSM module.

22. The method in accordance with claim 16, wherein the positional unit is configured to be affixed to the at least one segment with an inertial sensor unit.

23. The method in accordance with claim 16, wherein the positional unit is configured to be affixed to the inertial sensor unit that is also affixed to the at least one segment.

24. The method in accordance with claim 16, wherein affixing a positional unit to the at least one segment comprises affixing the positional unit to a segment having thereon an inertial sensor unit.

25. A method of tracking a human body having segments wherein adjacent segments are joined by intervening joints, each of one or more segments having an inertial sensor unit thereon to form a plurality of sensor units, one or more positional units being situated on one or more segments, the method comprising:
gathering 3D accelerometer data and 3D gyroscope data from the plurality of inertial sensor units;
predicting a position and orientation of each inertial sensor unit using dead reckoning;
correcting each predicted position and orientation for relative drift between the predicted inertial sensor unit positions and orientations by setting joint centers for each segment equal to the corresponding joint center of each adjoining segment;
gathering one or more positional measurements to determine a position of one or more positional units;
tracking a position and orientation of at least one of the segments in a frame of reference external to the body;
correcting the corrected predicted positions and orientations based on the position and orientation of the at least one segment to eliminate overall drift in the frame of reference of the tracking system;
determining a sensor unit trajectory for one or more of the sensor units;
predicting a trajectory of one or more positional units via the inertial sensor unit trajectories;
associating the gathered positional measurements with one or more inertial sensor units by using the predicted trajectory of one or more positional units;
modifying the inertial sensor unit trajectories using the associated positional measurements; and
calculating trajectories of the body segments by using the corrected and modified inertial sensor unit trajectories.

26. The method in accordance with claim 25, wherein predicting the trajectory of the positional unit includes using the inertial sensor unit trajectories in the frame of reference of the positional unit and wherein associating the gathered positional measurements with one or more inertial sensor units includes associating a positional measurement with a particular inertial sensor unit if the distance between the positional measurement and the positional unit position predicted by dead-reckoning for the particular inertial sensor unit meets a predetermined criterion.

27. The method in accordance with claim 25, wherein predicting the trajectory of the positional unit includes using the inertial sensor unit trajectories in an arbitrary frame of reference, and wherein associating the gathered positional measurements with one or more inertial sensor units includes evaluating a cost function for candidate associations between a set of positional measurements and positional unit positions predicted from a set of inertial sensor units, and selecting an association having the lowest cost function value.

28. The method in accordance with claim 27, wherein evaluating the cost function comprises determining a rigid body transformation between the set of positional measurements and positional unit positions predicted from the set of inertial sensor units.

29. The method in accordance with claim 27, wherein the evaluated cost function is independent of a rigid body transformation between the set of positional measurements and positional unit positions predicted from the set of inertial sensor units.

30. The method in accordance with claim 25, wherein associating the gathered positional measurements with one or more inertial sensor units further includes using at least one of a speed and a velocity trajectory of one or more positional units predicted via the inertial sensor unit trajectories.

31. The method in accordance with claim 28, wherein determining the rigid body transformation between the set of positional measurements and positional unit positions predicted from the set of inertial sensor units further includes reducing the degrees of freedom of the rigid body transformation by using a relationship between a gravity direction in a frame of reference of the positional units and a gravity direction in a frame of reference of the inertial sensor units.

32. The method in accordance with claim 28, wherein determining the rigid body transformation between the set of positional measurements and positional unit positions predicted from the set of inertial sensor units further includes reducing the degrees of freedom of the rigid body transformation by using a relationship between a heading direction in a frame of reference of the positional units and a heading direction in a frame of reference of the inertial sensor units.

33. The method in accordance with claim 25, wherein associating the gathered positional measurements with one or more inertial sensor units comprises:
evaluating a cost function for candidate associations between a subset of a set of positional measurements and positional unit positions predicted from a subset of a set of inertial sensor units;
selecting an association having the lowest cost function value;
determining a rigid body transformation between the associated subset of positional measurements and subset of inertial sensor units; and using the determined rigid body transformation to further determine the association between the remaining positional measurements in the set of positional measurements and positional unit positions predicted from the remaining inertial sensor units in the set of inertial sensor units.

* * * * *